United States Patent
Aleksandrov et al.

(10) Patent No.: US 9,690,563 B2
(45) Date of Patent: *Jun. 27, 2017

(54) UPDATING WEB RESOURCES

(75) Inventors: Anton Aleksandrov, Shefayim (IL); Amit Ben-Sheffer, Saba (IL); Raanan Avidor, Herzliya (IL); Yoav Bodor, Tel Aviv (IL); Ishai Borovoy, Shefayim (IL); Yaron Goldberg, Raanana (IL); Todd Eric Kaplinger, Raleigh, NC (US); Iddo Levin, Tel Aviv (IL); Ran Enriko Magen, Tel Aviv (IL); Ron Perry, Bnei Zion (IL); Artem Spector, Rishon Le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 707 days.

This patent is subject to a terminal disclaimer.

(21) Appl. No.: 13/474,063

(22) Filed: May 17, 2012

(65) Prior Publication Data

US 2013/0311599 A1    Nov. 21, 2013

(51) Int. Cl.
*G06F 15/16* (2006.01)
*G06F 9/445* (2006.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | |
|---|---|---|---|
| 6,167,567 A * | 12/2000 | Chiles et al. | 717/173 |
| 7,779,427 B2 * | 8/2010 | Polivy et al. | 719/327 |
| 2002/0010758 A1 | 1/2002 | Chan et al. | |
| 2003/0009583 A1 | 1/2003 | Chan et al. | |
| 2003/0088716 A1 * | 5/2003 | Sanders | 709/330 |
| 2004/0128347 A1 * | 7/2004 | Mason et al. | 709/203 |
| 2006/0047709 A1 * | 3/2006 | Belin et al. | 707/201 |
| 2006/0246950 A1 | 11/2006 | Lee et al. | |
| 2007/0180075 A1 * | 8/2007 | Chasman et al. | 709/223 |
| 2008/0077941 A1 * | 3/2008 | Holmes et al. | 719/326 |
| 2011/0289499 A1 * | 11/2011 | Haubold et al. | 717/173 |
| 2012/0042076 A1 | 2/2012 | Kawa et al. | |
| 2012/0046069 A1 | 2/2012 | Cupala et al. | |

* cited by examiner

*Primary Examiner* — Abdullahi E Salad
(74) *Attorney, Agent, or Firm* — Steven L. Nichols; Fabian VanCott

(57) ABSTRACT

Updating web resources includes extracting web resources from an application to local files in response to an initial start-up of the application, downloading updates to the web resources to the local files from an external server; and running the application using contents from the local files.

21 Claims, 6 Drawing Sheets

400

- Extract web resources from an application to local files in response to an initial start-up of the application — 401
- Download updates to the web resources to the local files from an external server — 402
- Run the application using contents from the local files — 403

UPDATING WEB RESOURCES

BACKGROUND

The present invention relates to updating web resources, and more specifically, updating web resources on devices that download and operate applications.

Applications for mobile devices, such as electronic tablets and cell phones, may be downloaded over the internet. These applications allow users to do a variety of activities such as read literature, create illustrations, annotate documents, play games, other activities, and combinations thereof. Often, a user will virtually visit an online application store where such applications may be downloaded for free or purchased for a price.

BRIEF SUMMARY

A method for updating web resources includes extracting web resources from an application to local files in response to an initial start-up of the application, downloading updates to the web resources to the local files from an external server, and running the application using contents from the local files.

A method for updating web resources includes downloading an application that has web resources, extracting web resources from the application to local files in response to an initial start-up of the application, querying an external server to identify updates to the web resources, downloading the updates to the web resources to the local files from the external server, and running the application using contents from the local files.

A method for updating web resources includes sending an application that has web resources to a client device, the application having a first component to extract the web resources to local files on the client device and a second component to use the web resource from the local files during an operation; receiving a query from the client device for updates to the web resources; and sending the updates to the client device.

A method for updating web resources includes extracting web resources from the application to permanent local files of a client device in response to an initial start-up of the application on the client device, querying an external server to identify updates to the web resources, the updates having a resource indictor with an identification for an operating system of the client device, downloading the updates to the web resources to the local files from the external server, and running the application using contents from the local files.

DETAILED DESCRIPTION

Figure 1:
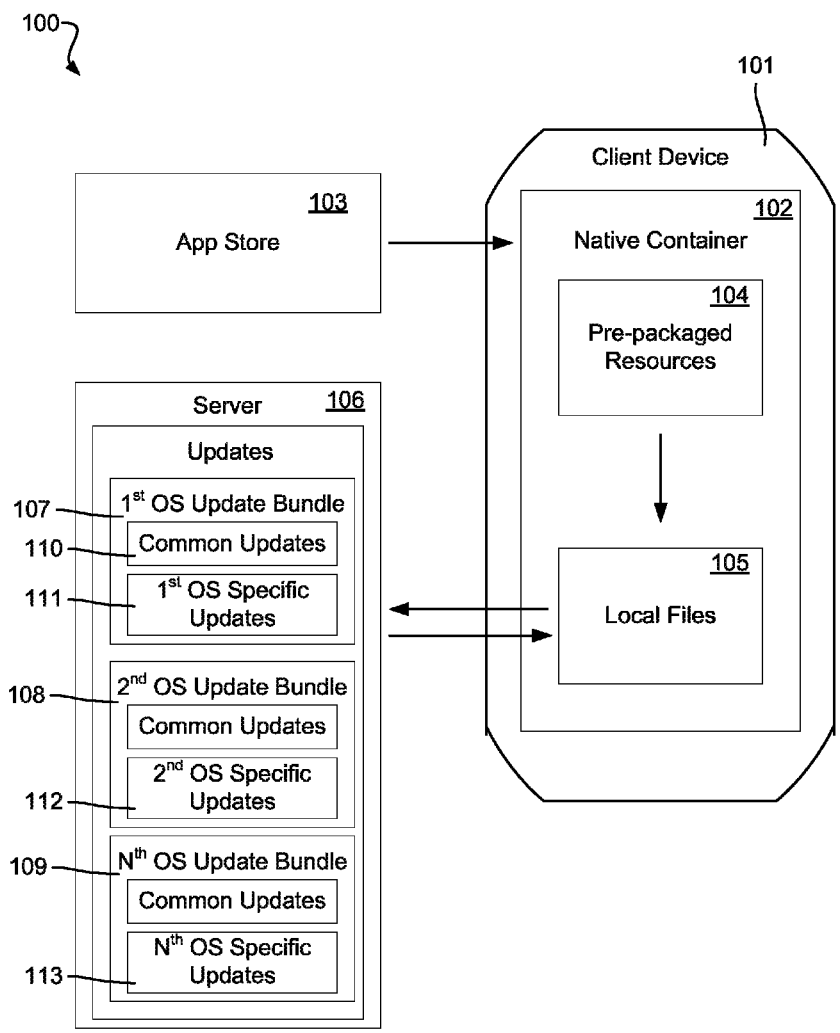
FIG. 1 is a diagram showing an illustrative system for updating web resources, according to one example of the principles described herein.

The present specification describes a method and system for updating web resources such that an application on a client device may have a quick start-up time while being easy to maintain without relying on a connection to an external server.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 is a diagram showing an illustrative system (100) for updating web resources. In this example, a client device (101) has a native container (102) that is used to operate an application that is downloaded from an online application store (103). Each downloaded application may have its own native container (102) dedicated to that application. The native container (102) may provide an interface with which a user may interface with an application through the client device (101).

In some examples, the client device is a mobile device, such as an electronic tablet, a phone, a hand held electronic device, a watch, other mobile device, or combinations thereof. A user may search the application store (103) with the client device (101) over an interact connection. In examples where a user requests to download an application from the store (103), the application store may send the application over the connection to the client device (101).

The application may contain machine readable instructions to extract pre-packaged web resources (104) from the application during the application's initial start-up and store the web resources in local files (105). The web resources may be markup language resources, client side scripting implementations, files, media resources, other resources, or combinations thereof. A list of non-exhaustive examples of markup language resources may include hypertext markup language (HTML) pages, cascading style sheets (CSS), other markup language resources, or combinations thereof. An example of client side scripting implementations may include JavaScript.

In some examples, the local files are created for the dedicated purpose of storing web resources. In some examples, the local files are permanent files that are saved to the client device. For example, the local files may be created with non-volatile memory, volatile memory, memory caches, random access memory, read only memory, electrically erasable programmable read only memory, flash memory, static memory, dynamic memory, other file locations, or combinations thereof.

When an application is operating, the application creates a private browser that implements web resources to run the application. The web resources may be located in the local files and the private browser may access the web resource through the local files.

During the initial operation of the application, the application may use just the web resources that were originally pre-packaged within the application. In some examples, however, the application queries an external server (106) for updates to the web resources during the application's initial use. In alternative examples, the application just queries the external server (106) on subsequent application start-ups. If updates are available, the external server (106) may send the updates to the client device (101), which may store the updates in the local files (105).

In response to downloading the updates, the application may begin to use the updated version of the web resources. In some examples, the application continues to use the older version of the web resources while the updated version is downloading. In some examples, the application waits to operate until the updated version is finished downloading. In other examples, the application continues to use the older version of the web resources until the next subsequent start-up. In some examples, the updated version replaces the older version of web resources. In other examples, the updated web resources merely replaces portions of the web resources. In some examples, the updated web resources are extracted to the local files after the download is complete. In such an example, if the download fails before completion, the updated web resources that were successfully downloaded may be extracted after the download fails or the updated web resources may be disregarded so that the complete download may be completed at a later time.

If no updates are available, the application may use the version of the web resources currently in the local files (105). The updates may be unavailable if there are no updates stored in the external server (106) or there is no connection between the client device (101) and the external server (106).

By pre-packaging the web resources in the application, the client device (101) is free to operate the application without relying on interact connectivity to access the web resources. Further, by downloading the web resources to local files, the application start-up time is minimized because the client device does not need to connect with an online source for access to the web resources. By downloading updated web resources as they become available, the application may receive the latest updates without having to re-download the entire application every time a web resource changes.

The external server (106) may include update bundles for updates targeted to client devices running on different operating systems. For examples, some updates may be specific to a particular operating system and may be unsuited for applications running on client devices operating with different operating systems. Thus, multiple versions of an update may be made, which each version tailored for a specific operating systems or other operating conditions of the client device. On the other hand, some updates may be common updates that are targeted to multiple operating systems.

In the example of FIG. 1, the external server (106) has a first operating system update bundle (107) targeted to client device with a first operating system, a second operating system update bundle (108) targeted to client device with a second operating system, and an $N^{th}$ operating system update bundle (109) targeted to a client device with an $N^{th}$ operating system, where "$N^{th}$" represents the last of any number of bundles or operating systems. Each of the bundles (107, 108, 109) may include common updates (110). Further, the first operating system update bundle (107) may include at least one first operating system specific update (111), the second operating system update bundle (108) may include at least one second operating system specific update (112), and the $N^{th}$ operating system update bundle (109) may include at least one $N^{th}$ operating system specific update (113).

In the example of FIG. 1, the external server (106) is a different internet location than where the application was original downloaded. In other examples, the external server provides both entire application for downloading and updates as they become available.

Figure 2:
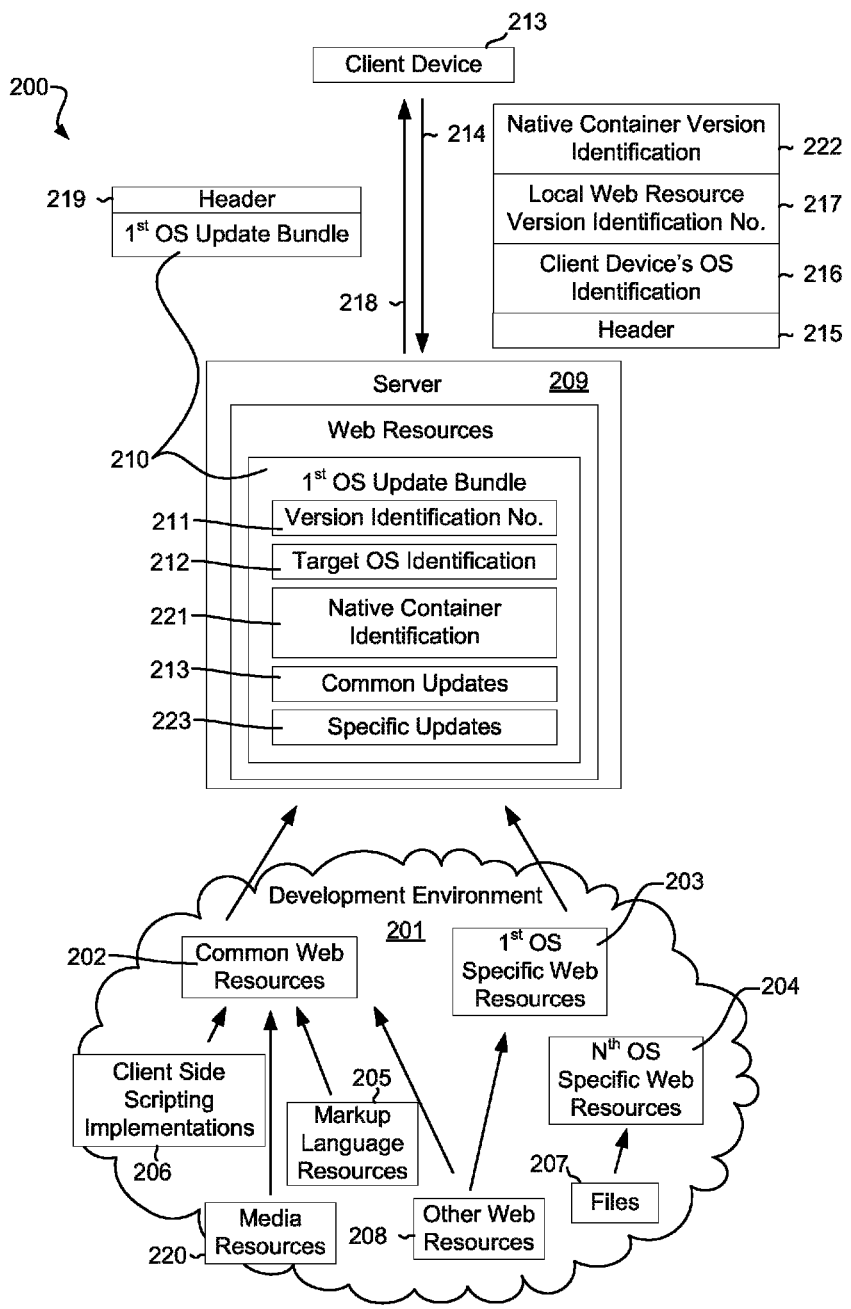
FIG. 2 is a diagram showing an illustrative system for updating web resources, according to one example of the principles described herein.

FIG. 2 is a diagram showing an illustrative system (200) for updating web resources. In this example, web resources are being assembled in a development environment (201) to create common web resources (202) that are targeted to multiple kinds of operating systems and specific web resources that are specific to particular kinds of operating systems. For example, the updates may use a single code that is specific for an operating system. In this example, the specific web resources include at least one first operating system specific web resource (203) and at least one $N^{th}$ operating system specific web resource (204). In this example, the web resources include markup language resources (205), client side scripting implementations (206), files (207), media resources (220), and other resources (208).

After the web resources are built they may be assembled into update bundles and sent to an external server (209) that may be queried by client devices. In this example, the external server (209) has a first operating system update bundle (210) that includes a version identification number (211), a target operating system identification (212), common updates folder (213) with updates common to multiple operating systems, and a native folder (223) with updates specific to particular operating systems. The version identification number (211) may be used to identify which version of updates is included in the bundle. The target operating system identification (212) may be used to identify the operating system for which the bundle is targeted.

In some examples, the update bundles are also marked with a native container identification (221), so the requesting client device may know for which version of the native container that the updates are intended. For example, an update may include web resources to run a specific feature, such as a voice recognition feature, that is supported in just the most recent version of the native container. If the client device does not have that version of the native container, the updates may not be compatible.

A client device (213) may query the external server (209) for updates to the application. The query (214) may include a header (215) that contains the server's address, the client device's operating service identification (216), a local web resource version identification number (217), and a native container version identification (222). The response (218) may include header (219), which contain the client device's address, and the first operating update bundle (210).

In some examples, the client device (213) knows its operating conditions. A non-exhaustive list of operation conditions may include web resource versions, native container versions, operating systems types, other conditions, and combinations thereof. In some examples, the web resource version may include a sequential version and a device optimization version. The sequential version may include versions where the latest version is the most up-to-date version of the web resources. The device optimization version may account for web resources that are intended for similar devices that use the slightly different versions of the same type of operating system. For example, applications may include different version of code that are each optimized for different types of devices. These different codes may all be pre-packed into the application prior to downloading from the online store and the appropriate code version is selected after downloading. When the client device (213) sends a query to the external server (209), the client device (213) may communicate to the server (209) any number of operating conditions to ensure consistency between the update bundles and the client device.

In some examples, the external server (209) recognizes that under the current operating conditions of the client device (213) that no compatible updates are available. However, in some examples, the external server (209) recognizes that the client device (213) is operating with an outdated version of a particular operation condition, such as an outdated native container. In such examples, the external server (209) may send a recommendation to the client device (213) to update a particular operating condition. In response, the client device (213) may request updates for the outdated operating condition and query the external server for web resource updates after updating the outdated operating condition. By sending updates to the client device (213) that are tailored to the operating conditions of the client device (213), both the server (209) and the client device (213) consume less processing energy, reduce bandwidth, and increase processing speed. In response to downloading updates for any of the operating conditions, the client device (213) may update its identifications.

Figure 3:
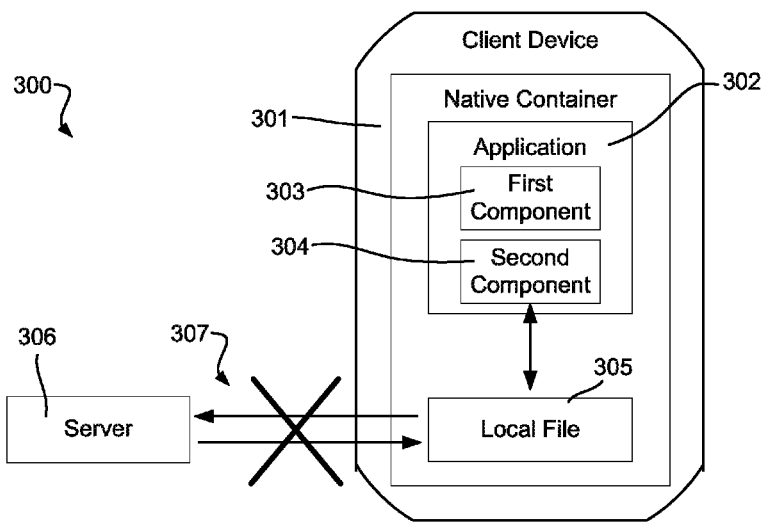
FIG. 3 is a diagram showing an illustrative system for operating an application, according to one example of the principles described herein.

FIG. 3 is a diagram showing an illustrative system (300) for operating an application. In this example, the client device (301) has a downloaded application (302) that has a first component (303) for extracting web resources in response to an initial application start-up and a second component (304) for operating the application. The second application (304) may access the web resources extracted by the first component (303) from the local files (305) during the application's operation and during the application's start-up.

The application (302) may include machine readable instructions to query the external server (306) for updates to the web resources. In the example of FIG. 3, the query is sent during a non-connectivity period between the server (306) and the client device (301). In FIG. 3, the non-connectivity period is depicted with cross (307). The non-connectivity period may include periods where the external server (306) is turned off or out of range. In some examples, the non-connectivity period includes times when the server (306) is capable of receiving the query from the client device (301), but the server (306) is fails to send all or part of the web resource updates.

In some examples, the updated web resources are extracted to the local files after the download is complete. In such an example, if the download fails before completion, the updated web resources that were successfully downloaded may be extracted after the download fails or the updated web resources may be disregarded so that the complete download may be completed at a later time.

Figure 4:
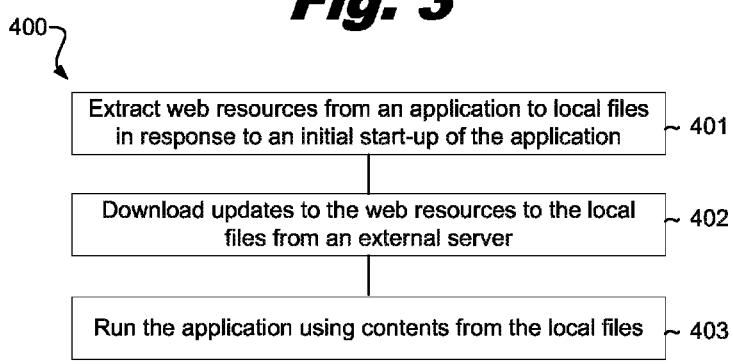
FIG. 4 is a diagram showing an illustrative method for updating web resources, according to one example of the principles described herein.

FIG. 4 is a diagram showing an illustrative method (400) for updating web resources. In this example, the method (400) includes extracting (401) web resources from an application to local files in response to an initial start-up of the application, downloading (402) updates to the web resources to the local files from an external server, and running (403) the application using contents from the local files. The contents of the local files may be the most recent version of the web resources.

In some examples, the method (400) is performed by the client device, a processor, the application, or combinations thereof. The method (400) may include querying the external server to identify the updates. Running the application may include running the application during a period of non-connectivity with the external server. Further, running the application may include running the application during an operation subsequent the time when the application was initially started-up.

In some examples, extracting web resources from an application to local files in response to an initial start-up of the application includes creating permanent files for the web resources. In some examples, the web resources are pre-packaged within the application when the application is originally downloaded. The web resources may include markup language resources, client side scripting implementations, files, media resources, other resources, or combinations thereof.

Downloading the updates may include downloading an updated version of the web resources or downloading portions of the web resources. In some examples, the updates replace the web resources originally in the local files. The updates may include a resource identifier. In some examples, the resource identifier contains a web resource version identification. Further, the resource identifier may include a target operating system identification.

In some examples, downloading updates to the local files includes downloading the updates from a native folder that has specific updates targeted to a specific operating system. Further, in some examples, the updates include a common folder that contains common updates that are targeted for multiple operating systems. In some examples, when there is a conflict between the common updates and the specific updates, the specific updates may override the common updates. For example, if a definition, logic, or a resource in the common updates conflict with those of the specific updates, the application may implement those from the specific updates.

Figure 5:
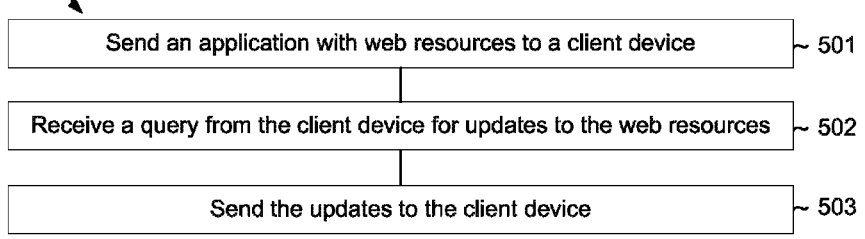
FIG. 5 is a diagram showing an illustrative method for updating web resources, according to one example of the principles described herein.

FIG. 5 is a diagram showing an illustrative method (500) for updating web resources. In this example, the method (500) includes sending (501) an application with web resource to a client device. The application includes a first component for extracting the web resources to local files on the client device and a second component for operating the application using the web resources from the local files. In FIG. 5, the method (500) further includes receiving (502) a query from the client device for updates to the web resources and sending (503) the updates to the client device.

In some examples, the updates include specific updates targeted to a specific operating system. The updates may also include common updates that are targeted to multiple operating systems. The specific updates may override the common updates when a conflict between the common updates and the specific updates exist.

Figure 6:
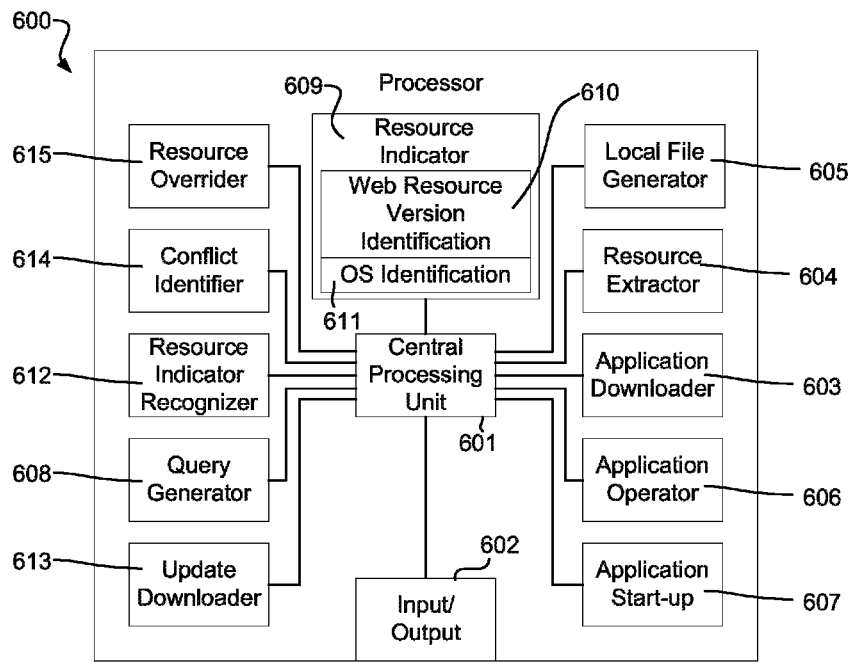
FIG. 6 is a diagram showing an illustrative processor, according to one example of the principles described herein.

FIG. 6 is a diagram showing an illustrative processor (600). In this example, a central processing unit (CPU) (601) is in communication with an input/output (602). The CPU (601) may be in communication with an application downloader (603) that may download an application for a client device from an online source. A resource extractor (604) may extract web resources pre-packaged in the application and put them into local files created by a local file generator (605). In some examples, the local files are in location off of the processor chip, but in alternative examples, the local files are located on processor's chip.

The CPU (601) may also be in communication with an application operator (606) that operates the application. An application start-up (607) may start the application for the initial start-up and/or subsequent start-ups. In some examples, the resource extractor (604) extracts the web resources from the application during the initial start-up of the application on the client device. During operation, the application operator (606) may access the local files for web resources that were extracted from the application.

During a start-up or during the application's operation, a query generator (608) may generate a query for updates. The CPU (601) may send the query to the input/output (602) that sends the query to an external server to look for updates. The external server may be located at some location accessible over the internet. In some examples, the external server is located over a network, such as a local area network, a wide area network, a telecommunications network, a private virtual network, a corporate network, another type of network, or combinations thereof.

The query may include a resource indicator (609), which may include a web resource version identification (610) and/or an operating system identification (611). The resource indicator (609) may be used to identify an appropriate update bundle that is tailor made for the client device. For example, the web resource version identification (610) may include an identification of the current version of web resources being used in the local files. If the external server has a more updated version than the current version in the local files, then the external server may recognize that the client device needs the updated version. Also, the operating system identification (611) may include an identification that allows the external server to recognize the client device's type of operating system and send an update bundle that has updates that are specific to that type of operating system.

In the example of FIG. 6, the processor (600) includes a resource indicator recognizer (612) that may be used to determine if an update bundle sent from the external server is appropriate for the client device. For example, the resource indicator recognizer (612) may check the operating system identifier and/or a version identifier included in an update bundle from the external server. If the version identifier indicates that the update version sent by the external server is newer than what is currently in the local files, an update downloader (613) may download the newer version of updates. The newer update version may replace the current version in the local files in whole or in part. If the version identifier indicates that the version in the update bundle is not newer than what is included in the local files, then the processor (600) may disregard the update. Likewise, if the operating system identifier in the update bundle indicates that the update is intended for an application operated on a device with an operating system other than the client device's operating system, then the processor (600) may also disregard the update bundle.

The updates may include common web resources that may be universally used on devices operating on any operating system. Also, the updates may include specific updates that are specific to just the type of operating system used by the client device. The processor (600) may include a conflict identifier (614) that identifies whether there is a conflict between the common and specific updates. If there is a conflict between the common and specific updates, then a resource overrider (615) may cause the specific updates to override the common updates when the application is in use.

Figure 7:
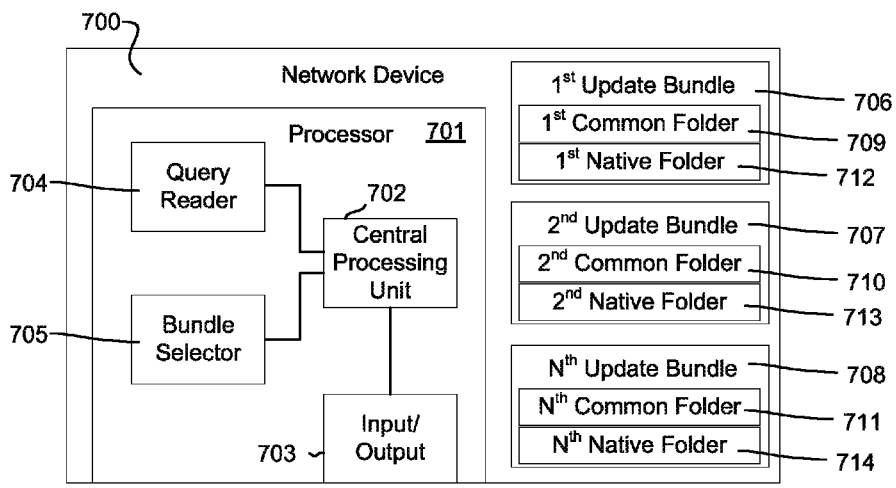
FIG. 7 is a diagram showing an illustrative network device, according to one example of the principles described herein.

FIG. 7 is a diagram showing an illustrative network device (700), such as an external server. In this example, the network device (700) has a processor (601) with a central processing unit (CPU) (702) that is in communication with an input/output (703). The processor (701) may receive a query from a client device looking for updates. The processor (701) may include a query reader (704) that identifies whether an update bundle should be sent back to the client device. If so, a bundle selector (705) may identify the appropriate bundle with the correct version and operating system for the client device.

In this example, the network device (700) contains a first update bundle (706), a second update bundle (707), and an $N^{th}$ update bundle (708), where the $N^{th}$ represents the last of any number of bundles contained in the network device (700). Each of the update bundles (706, 707, 708) may also include common folders (709, 710, 711) that contain the same updates that are intended for all operating systems. Further, each of the update bundles (706, 707, 708) may also include native folders (712, 713, 714) that contain updates that are specific to just certain types of operating systems.

In this example, the update bundles (706, 707, 708) are stored off of the processor (701), but in some examples, the update bundles is stored on the processor's chip. In response to selecting the appropriate update bundle, the processor may cause the appropriate update bundle to be sent to the client device.

Figure 8:
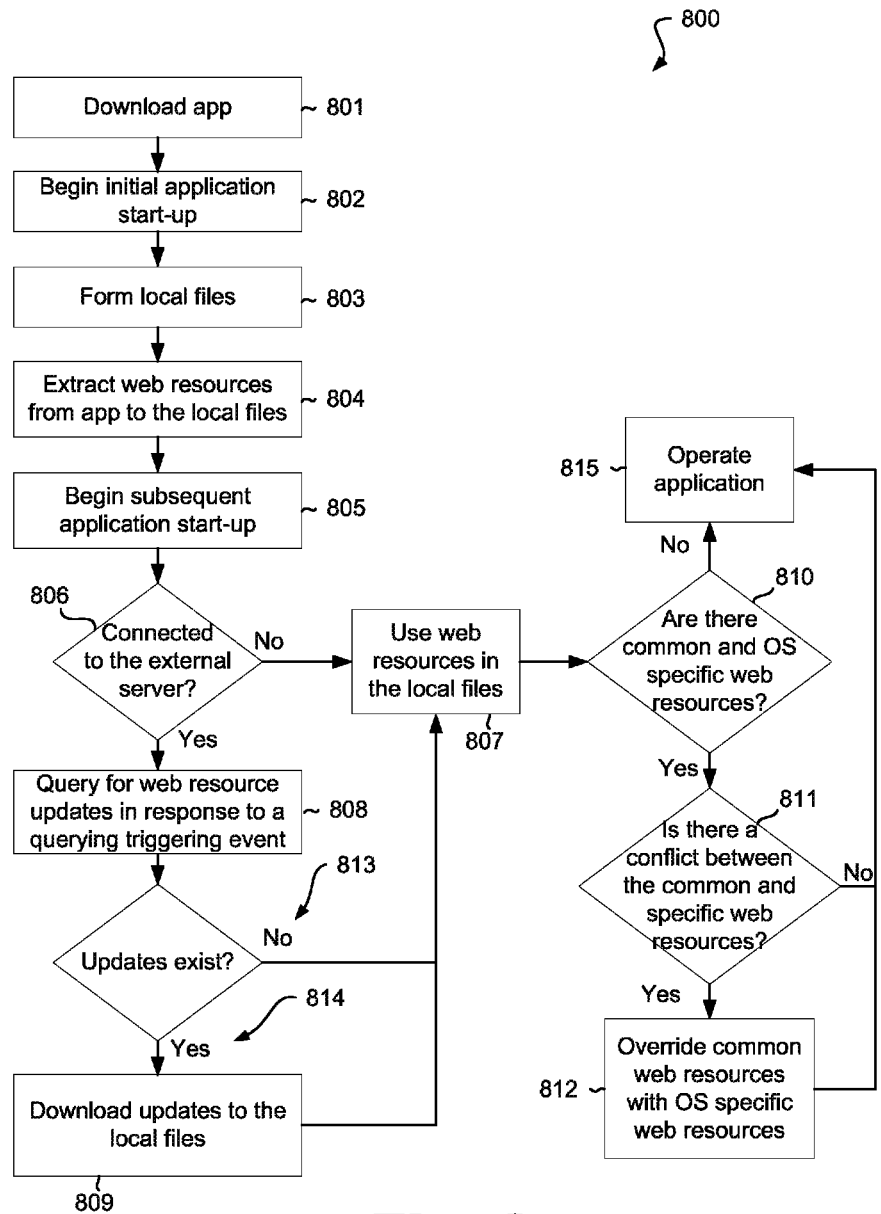
FIG. 8 is a diagram showing an illustrative flowchart of a process for updating web resources, according to one example of the principles described herein.

FIG. 8 is a diagram showing an illustrative flowchart (800) of a process for updating web resources. In this example, the flowchart (800) includes downloading (801) the application from an online source. The process may also include beginning (802) an initial application start-up of the application on the client device. The start-up may include forming (803) local files and extracting (804) web resources from the application to the local files. While the application is running, the application may use the web resources in the local files.

In response to beginning (805) a subsequent application start-up, the process may include determining (806) whether the client device has a connection to the external server. If not, the application may use (807) the web resources in the local files to operate the application. If the client device establishes a connection with the external server, then the process may include querying (808) the external server for web resource updates in response to a querying triggering event. In some examples, a non-exhaustive list of query trigging events includes a start-up of the application, an expiration of a run time of the client device, a change in a foreground/background status of the application, a closure of the application, another query triggering event, or combinations thereof. If the external server does not have any updates (813), then the process may include using (807) the web resources in the local files to operate the application. If updates exist (814), then the process may include downloading (809) the updates to the local files. In some examples, downloading the updates includes replacing the original contents of the local files in whole or in part at the completion of the download. In other examples, the updates replace the local files' contents in whole or in part at a later time, such as at the beginning of a subsequent application start-up or at the termination of the current application's operation. After downloading, the process may include using (807) the web resources in the local files to operate the application.

The process may also include determining (810) whether there are both common and operating system specific web resources in the local files. If so, then determining (811) whether there is a conflict between the common and operating system specific web resources. If there is a conflict, then the process may include overriding (812) the common web resources with the operating specific web resources. When the process determines that both common and specific web resources do not exist or that there is no conflict between such web resources, the process may include operating (815) the application. In some examples, the process includes operating the application after overriding any conflicts, and in other applications the process includes just overriding conflicts as they become relevant during the operation of the application.

Figure 9:
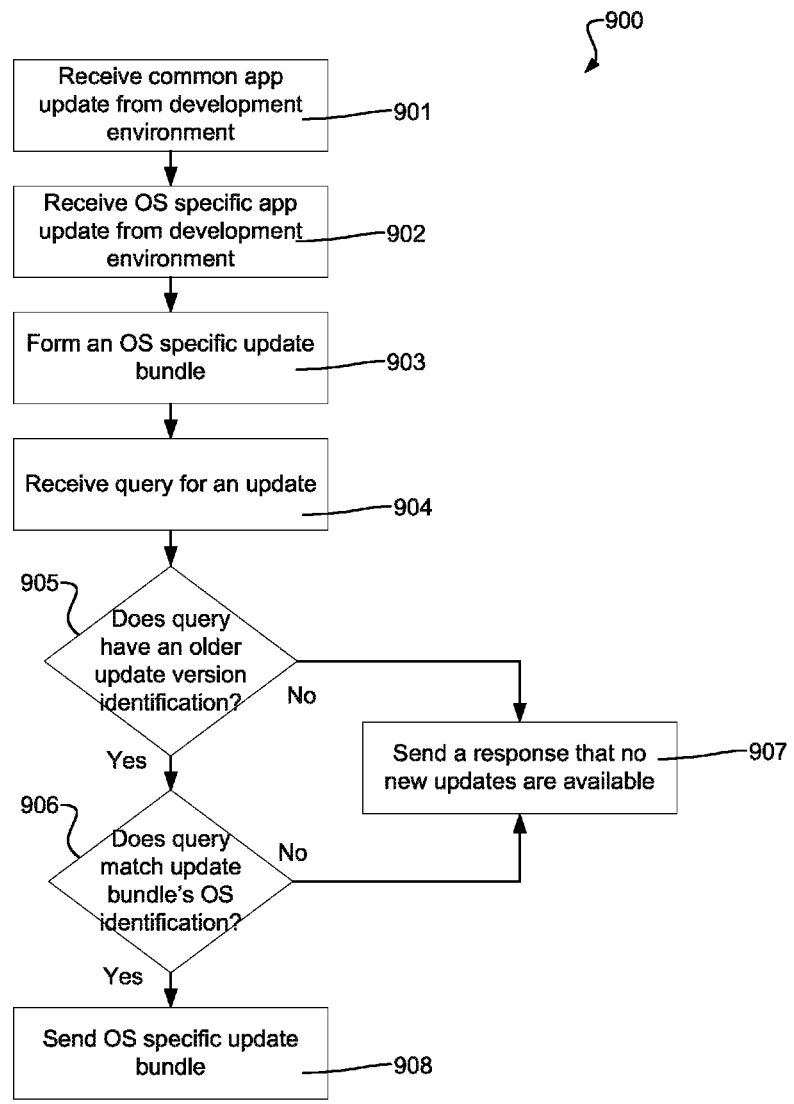
FIG. 9 is a diagram showing an illustrative flowchart of a process for updating web resources, according to one example of the principles described herein.

FIG. 9 is a diagram showing an illustrative flowchart (900) of a process for updating web resources. In this example, the flowchart (900) includes receiving (901) common application updates from a development environment and receiving (902) operating system specific application updates also from the development environment. The process may further include forming (903) an operating system specific update bundle with both common application updates and operating system specific application updates. The process may also include receiving (904) a query for any available web resource updates.

The process may include determining (905) whether the query has an older update version identification and determining (906) whether the query matches the update bundle's operating system's identification. If either determination comes up negative, the process may include sending (907) a response that no new updates are available. However, if both of the determinations (905, 906) are affirmative, then the process may include sending (908) the appropriate operating system specific update bundle in response.

While the above examples have been described with specific servers and specific client devices, any servers or client devices may be used according to the principles described herein. Further, while the above examples have been described with specific indicators for matching queries with appropriate updates, any indicators may be used according to the principles described herein. Further, while specific query and response structures have been described with the above mentioned examples, any structures for queries or responses may be used in accordance with the principles described herein. Further, while specific update bundles have been described with both specific and common updates, the scope of the principles described herein includes bundles with just common or just specific updates.

Further, while some of the above examples have been described with specific subsequent application start-ups, a subsequent application start-up may be any start-up of the application that occurs after the initial application start-up. While some of the examples have been described with specific types of web resources, any web resources may be included within the scope of the principles described herein.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method for updating web resources, comprising:
   extracting web resources from an application to local files of a client device;
   downloading updates to said web resources to said local files from an external server; and
   running said application using contents from said local files;
   wherein said application, as downloaded to said client device, comprises machine readable instructions to extract the web resources which are pre-packaged in the downloaded application.

2. The method of claim 1, further comprising accessing said web resources of said local files with a private browser of said application.

3. The method of claim 1, further comprising querying said external server to identify said updates in response to any of start-up of said application, an expiration of a run time of said client device, a change in a foreground/background status of said application, a closure of said application, or combinations thereof.

4. The method of claim 1, further comprising continuing to use an older version of said web resources from said local files while an update is downloading.

5. The method of claim 1, wherein downloading an updated version of said web resources includes downloading said updates with a resource indicator.

6. The method of claim 5, wherein said resource indicator comprises a web resource version identification.

7. The method of claim 5, wherein said resource indicator comprises a target operating system identification.

8. The method of claim 1, wherein running said application using contents from said local files includes running said application during a period of non-connectivity with said external server.

9. The method of claim 1, wherein downloading updates to said web resources to said local files from an external server includes downloading said updates from a native folder that comprises specific updates that are targeted to a specific operating system.

10. The method of claim 9, wherein downloading updates to said web resources to said local files from an external server includes downloading said updates from a common folder that comprises common updates that are targeted to multiple operating systems.

11. The method of claim 1, wherein downloading updates to said web resources to said local files from an external server includes downloading specific updates specific to said client device that override common updates that are compatible with multiple client devices.

12. The method of claim 1, further comprising operating said application and local files in a native container on said client device, said native container providing an interface for the application through the client device.

13. The method of claim 1, wherein said web resources include markup language resources, client side scripting implementations, files, media resources, or combinations thereof.

14. A method for updating web resources, comprising:
   extracting web resources from an application to local files of a client device;
   downloading updates to said web resources to said local from an external server;
   running said application using contents from said files;
   upon an initial startup of said application, using only said web resources extracted from said application and
   upon a subsequent application startup, querying the external server for an update to said web resources.

15. A method for updating web resources, comprising:
   extracting web resources from an application to local files of a client device;
   downloading updates to said web resources to said local files from an external server; and
   running said application using contents from said local files,
   wherein downloading updates to said web resources to said local files from an external server includes downloading said updates from a native folder that comprises specific updates that are targeted to a specific operating system;
   wherein downloading updates to said web resources to said local files from an external server includes downloading said updates from a common folder that comprises common updates that are targeted to multiple operating systems,
   the method further comprising overriding said common updates with said specific updates in response to a conflict between said common and specific updates.

16. A method for updating web resources, comprising:
   downloading an application comprising web resources;
   extracting web resources from said application to local files in response to an initial start-up of said application;
   querying a server to identify updates to said web resources;
   downloading said updates to said web resources to said local files from an external server; and
   running said application using contents from said local files.

17. The method of claim 16, wherein running said application using contents from said local files includes running said application during a subsequent start-up during a period of non-connectivity with said external server.

18. The method of claim 16, further comprising operating said application and local files in a native container on a client device, said native container providing an interface for the application through the client device;
   wherein downloading updates to said web resources to said local files from an external server includes an update bundle marked with a native container identification with which the client device determines for which version of the native container the update applies.

19. A method for updating web resources, comprising:
extracting web resources from an application to permanent local files of a client device in response to an initial start-up of said application on said client device;
querying a server to identify updates to said web resources, said updates comprising a resource indictor comprising an identification for an operating system of said client device;
downloading said updates to said web resources to said permanent local files from an external server; and
running said application using contents from said permanent local files.

20. The method of claim 19, wherein running said application using contents from said permanent local files includes running said application during a non-connectivity period with said external server.

21. The method of claim 19, wherein running said application using contents from said permanent local files includes running said application during a subsequent start-up of said application.

* * * * *